(12) United States Patent
Majewicz et al.

(10) Patent No.: US 9,332,156 B2
(45) Date of Patent: May 3, 2016

(54) GLARE AND SHADOW MITIGATION BY FUSING MULTIPLE FRAMES

(75) Inventors: Peter Ivan Majewicz, Boise, ID (US); Thanh Ha, Santa Clara, CA (US); Jan Allebach, West Lafayette, IN (US)

(73) Assignees: Hewlett-Packard Development Company, L.P., Houston, TX (US); Purdue Research Foundation, West Lafayette, IN (US)

( * ) Notice: Subject to any disclaimer, the term of this patent is extended or adjusted under 35 U.S.C. 154(b) by 1042 days.

(21) Appl. No.: 13/156,526

(22) Filed: Jun. 9, 2011

(65) Prior Publication Data
US 2012/0314103 A1    Dec. 13, 2012

(51) Int. Cl.
| | |
|---|---|
| H04N 1/409 | (2006.01) |
| H04N 1/387 | (2006.01) |
| H04N 5/235 | (2006.01) |
| H04N 1/195 | (2006.01) |

(52) U.S. Cl.
CPC .......... H04N 1/4092 (2013.01); H04N 1/3871 (2013.01); H04N 5/2354 (2013.01); H04N 5/2355 (2013.01); H04N 1/19594 (2013.01); H04N 2201/0458 (2013.01)

(58) Field of Classification Search
CPC . H04N 5/2256; H04N 5/2354; H04N 1/4092; H04N 1/3871; H04N 5/2355; H04N 2201/0458; H04N 1/19594
USPC .................... 348/222.1, 221.1, 362, 370, 371
See application file for complete search history.

(56) References Cited

U.S. PATENT DOCUMENTS

| | | | |
|---|---|---|---|
| 6,088,470 A | * | 7/2000 | Camus ................. G06K 9/0061 351/207 |
| 6,729,927 B2 | | 5/2004 | Stagnitto et al. |
| 7,088,388 B2 | | 8/2006 | MacLean et al. |
| 7,362,882 B2 | | 4/2008 | Eisenmann et al. |
| 7,496,228 B2 | | 2/2009 | Landwehr et al. |
| 7,646,422 B2 | * | 1/2010 | Kisacanin ............. A61B 3/113 348/370 |
| 2004/0042640 A1 | * | 3/2004 | Ikeda ....................... G06K 9/40 382/115 |
| 2005/0129324 A1 | | 6/2005 | Lemke |
| 2009/0073307 A1 | | 3/2009 | Kramer et al. |

(Continued)

FOREIGN PATENT DOCUMENTS

WO    2010073172 A2    7/2010

OTHER PUBLICATIONS

Summet et.al, "Shadow Elimination and Blinding Light Suppression for Interactive Projected Displays" http://ieeexplore.ieee.org~pp. 508-517; vol. 13; Issue: 3—2007.
Tat et.al,—"Shadow elimination and occluder light suppression for multi-projector displays", http://ieeexplore.ieee.org—1 pg,—2012.

*Primary Examiner* — Twyler Haskins
*Assistant Examiner* — Peter Chon
(74) *Attorney, Agent, or Firm* — Fabian VanCott

(57) ABSTRACT

In one example, a method for glare and shadow mitigation by fusing multiple frames includes illuminating the target with light from a first illumination direction and capturing a first frame of the target with a camera while the target is illuminated in the first illumination direction. The method also includes illuminating the target with light from a second illumination direction and capturing a second frame of the target with the camera while the target is illuminated in the second illumination direction. The first frame and second frame are fused together to form a composite image that simultaneously mitigates glare and shadow areas.

20 Claims, 12 Drawing Sheets

(56) References Cited

U.S. PATENT DOCUMENTS

| | | |
|---|---|---|
| 2010/0053357 A1 | 3/2010 | Ikeda |
| 2011/0273620 A1 | 11/2011 | Berkovich et al. |
| 2012/0170803 A1 * | 7/2012 | Millar ............... G06K 9/00771 382/103 |
| 2013/0329073 A1 * | 12/2013 | Majewicz ............ H04N 1/387 348/222.1 |

* cited by examiner

GLARE AND SHADOW MITIGATION BY FUSING MULTIPLE FRAMES

BACKGROUND

When a flash lamp or other directional light source illuminates a scene, there is considerable risk of objectionable glare and shadow in the captured image. This is most likely to occur when the lamp and camera are close to the scene and when the scene contains glossy surfaces. Glare washes out text printed on glossy media and corrupts detail on glossy objects. Tall objects cast sharp and long shadows. These artifacts corrupt the perceived shape of objects. On occasion, the artifacts can render an object un-identifiable.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The specification presents systems and methods that simultaneously mitigate glare and shadow in scenes illuminated from at least two different directions. The camera captures a frame for each illumination direction. The technique analyzes the frames and generates a shadow mask for each frame. The technique employs the shadow masks in a fusing operation. The fusing operation blends the frames into a single high quality image with substantially reduced effects from glare and shadow.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
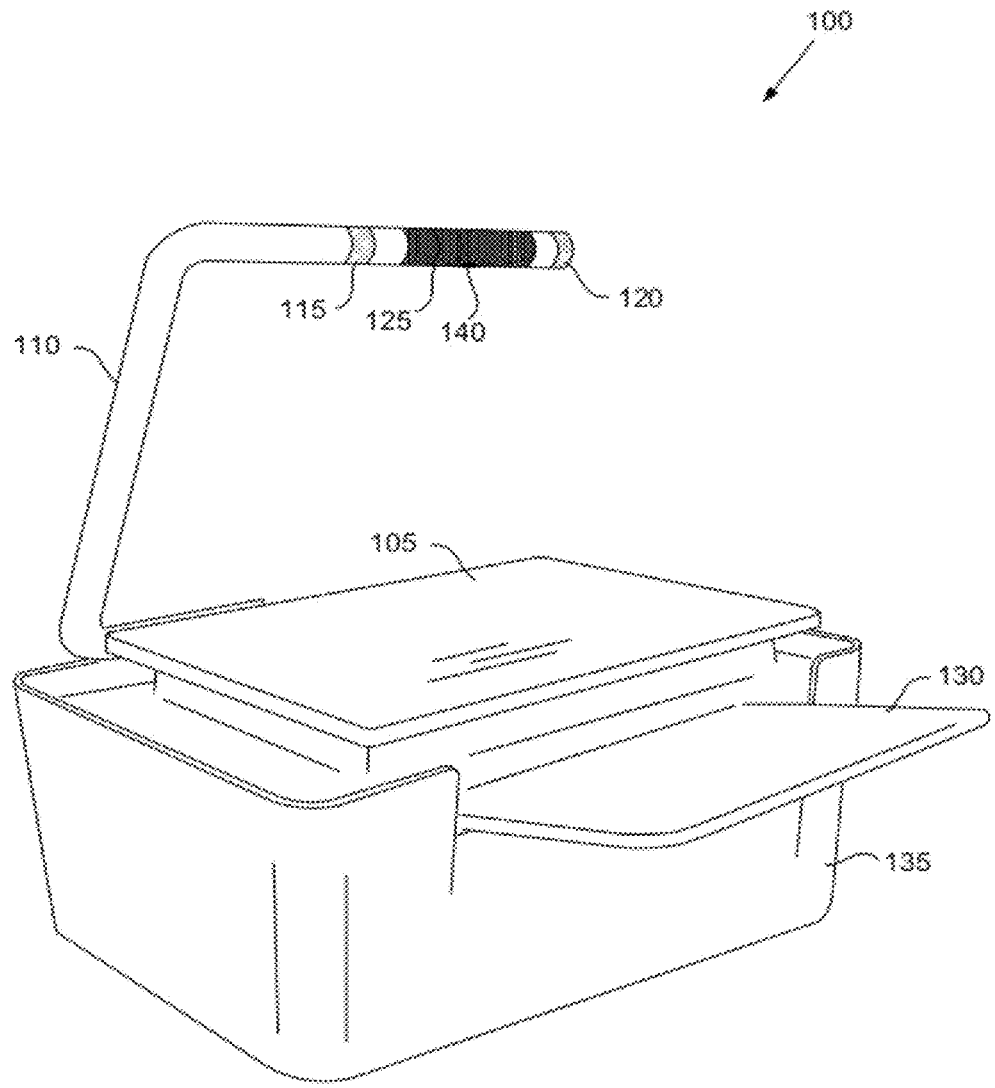
FIG. 1 is a perspective view of an illustrative imaging system, according to one example of principles described herein.

FIG. 1 is a perspective view of an illustrative imaging system (100). The system includes an arm (110) that can be elevated over a platen (105). The arm (110) includes one centrally located digital camera (140) and three LED flash lamps (115, 120, 125). One lamp (125) is adjacent to the camera (140). The others are located left and right of the camera (140) and provide light at glancing angles. In this example, the imaging system is integrated with a print engine (135). The paper output tray (130) of the print engine (135) is also shown.

Figure 2:
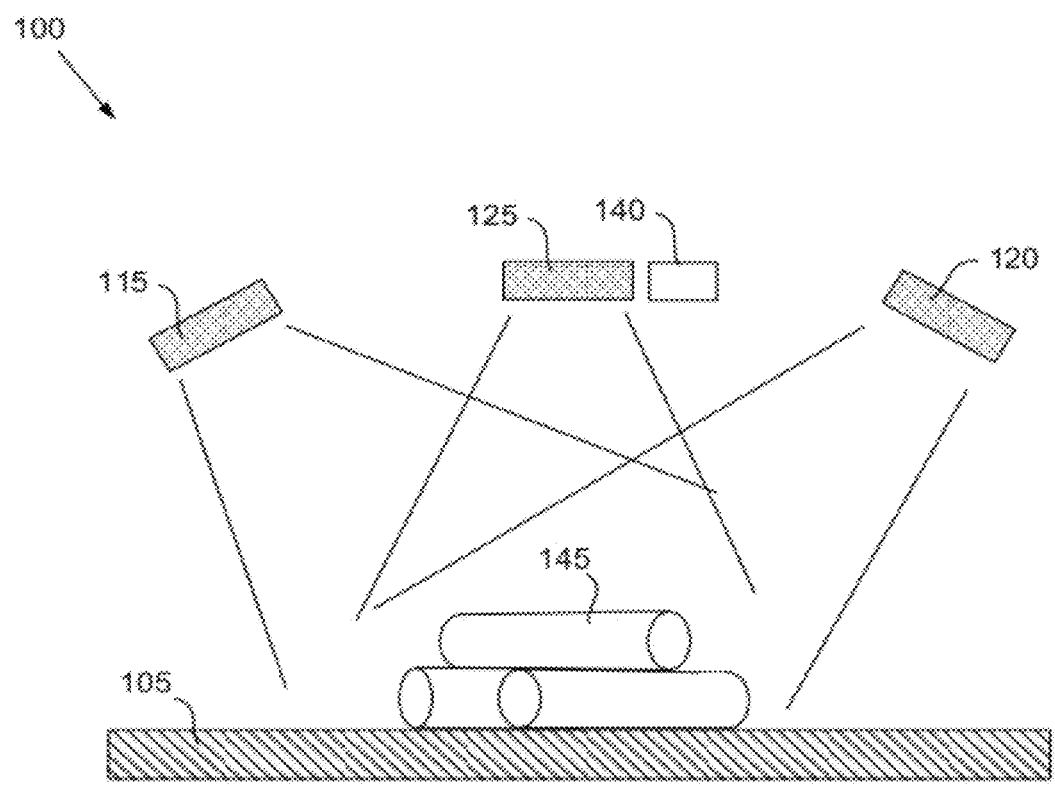
FIG. 2 is a side cross-sectional diagram of an illustrative imaging system that illuminates a target from multiple angles, according to one example of principles described herein.

FIG. 2 is a simplified schematic diagram of the illustrative imaging system (100). In this implementation, all imaging elements (115, 120, 125, 140) are located in a plane perpendicular to a platen (105). The platen (105) holds documents and small objects for imaging. In this example, the platen (105) is supporting stacked cylinders (145). Unlike typical photographic arrangements, the imaging system (100) locates the camera (140) and lamps (115, 120, 125) relatively close to the platen (205). In one implementation, the camera (140) and lamps (115, 120, 125) are located approximately 150 to 300 mm above the platen (105). These close focal distances can be more prone to glare and shadow. As discussed above, the lamps (115, 120, 125) illuminate the objects (145) placed on the platen (105) from different directions. For example, the left lamp (115) illuminates the stacked cylinders (145) from the left side. Under this illumination, the cylinders (145) cast shadows to the right. Similarly, the right lamp (120) illuminates the cylinders (145) from the right side and shadows are cast to the left.

The hardware described above is only one illustrative example. A variety of other hardware configurations could be used to illuminate a target from at least two different directions during imaging. Generally, more directions produce better glare and shadow mitigation. More directions improve the chance that a glare and shadow area in one frame will not exist in another. The systems and methods described below are extendable to a variety of situations where the target is imaged with at least two different illumination directions. The illumination can be provided by any appropriate light sources that provide illumination from any angle, provided that the light sources have color temperatures which are approximately equal.

According to one implementation, a series of initial frames are captured by the camera (140) using different illumination for each frame. For example, the hardware may capture four raw frames under different illumination. Three of the frames are illuminated individually by the three different lamps (115, 120, 125). The fourth frame is illuminated only by ambient lighting and is referred to as the "ambient" frame.

Figure 3A:
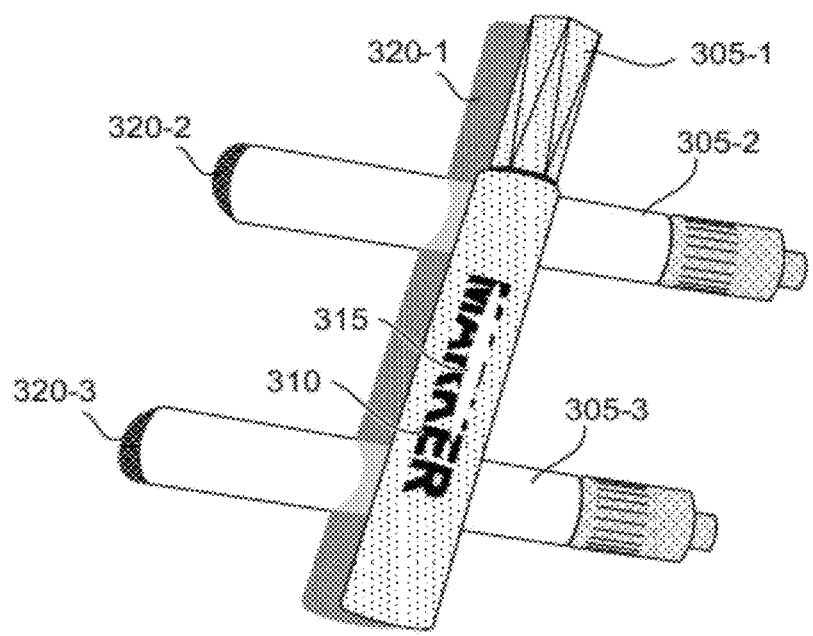
FIGS. 3A-3D are simulated images representing frames taken under different lighting directions and conditions, according to one example of principles described herein.

FIGS. 3A-3D are illustrations of four frames of three stacked markers that were supported on the platen (105) and imaged by the camera (140) using different illumination for each frame. FIG. 3A shows a frame that has been illuminated by the right lamp (120, FIG. 2). The illumination by the right lamp (120, FIG. 2) casts a shadow to the left of the markers (305) and produces a glare (315) across the text (310) printed on the glossy upper surface of the marker (305-1).

Figure 3B:
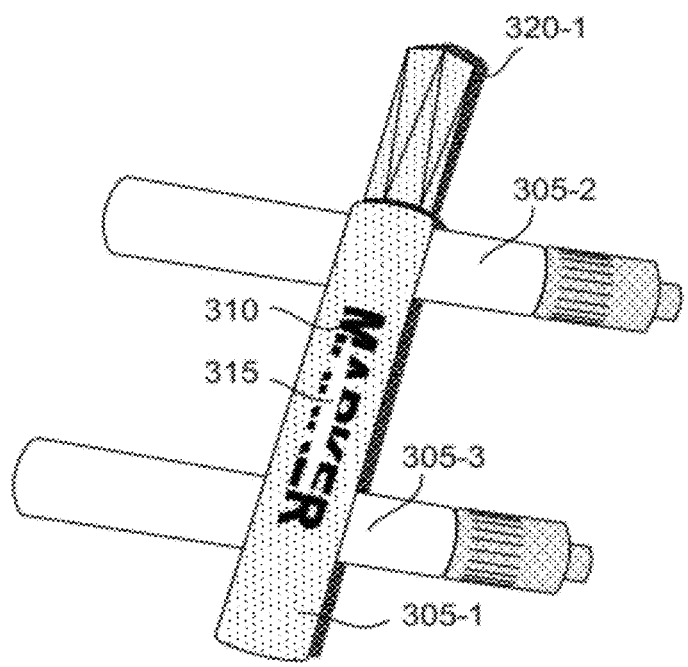

FIG. 3B is a frame that has been illuminated by the center lamp. This minimizes the shadows (320) but places the glare (315) directly on top of the text (310). As discussed above, the glare on glossy surfaces can obscure pictures, text, or other features of the imaged object.

Figure 3C:
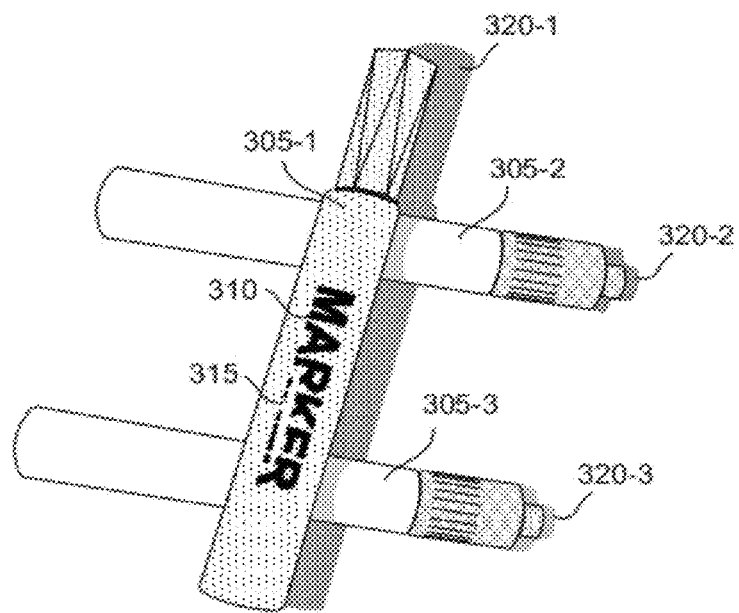

FIG. 3C is a frame that as been taken while the markers (305) are illuminated by the left flash lamp (FIG. 2, 115). The left flash lamp produces shadows (320) that fall to the right of the markers (305) and a glare (315) that is located over a different portion of the text (310).

Figure 3D:
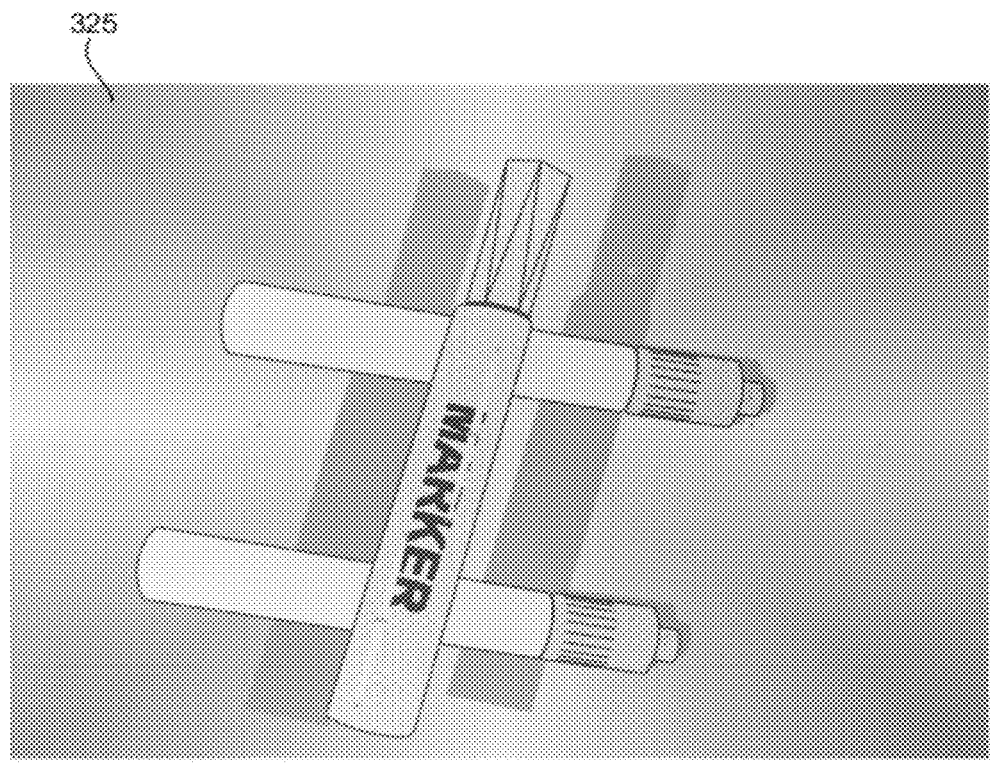

FIG. 3D is a frame (325) that was taken under ambient lighting conditions. The quality of the image is highly dependent on the illumination available in the surroundings. The ambient frame (325) will tend to be dark compared to flash lamp illuminated images. A variety of contrast enhancing techniques can be used to improve desired characteristics in the frame (325).

According to one example, the system and method for glare and shadow mitigation by fusing multiple frames begins with the capture of multiple images of an object/scene under different lighting conditions. Let $I=\{I_0, I_1, I_2, \ldots I_{n-1}\}$ be the set of initial RGB color frames captured by the system for each unique illumination direction, where n is the number of directions and the index 0 indicates the ambient frame that is treated slightly differently. The specification will follow similar terminology throughout: It will specify a frame type with a capital letter or mnemonic phrase with at least one capital letter. A numeric subscript corresponding to one of the illumination directions $i \in \{0, 1, 2, \ldots n-1\}$ may also be used following the mnemonic. The sets of frames and combined frames will be represented without a subscript. A pixel of a frame will be represented by coordinates (x, y) following the mnemonic. Single value constants and variables will be lower-case letters.

The ambient frame (325) tends to be dark when captured with the camera exposure settings of the lamp frames. The disclosed technique digitally lightens and enhances the contrast of the ambient frame $I_0$. As discussed above, the ambient frame $I_0$ is illustrated in FIG. 3D.

Figure 5A:
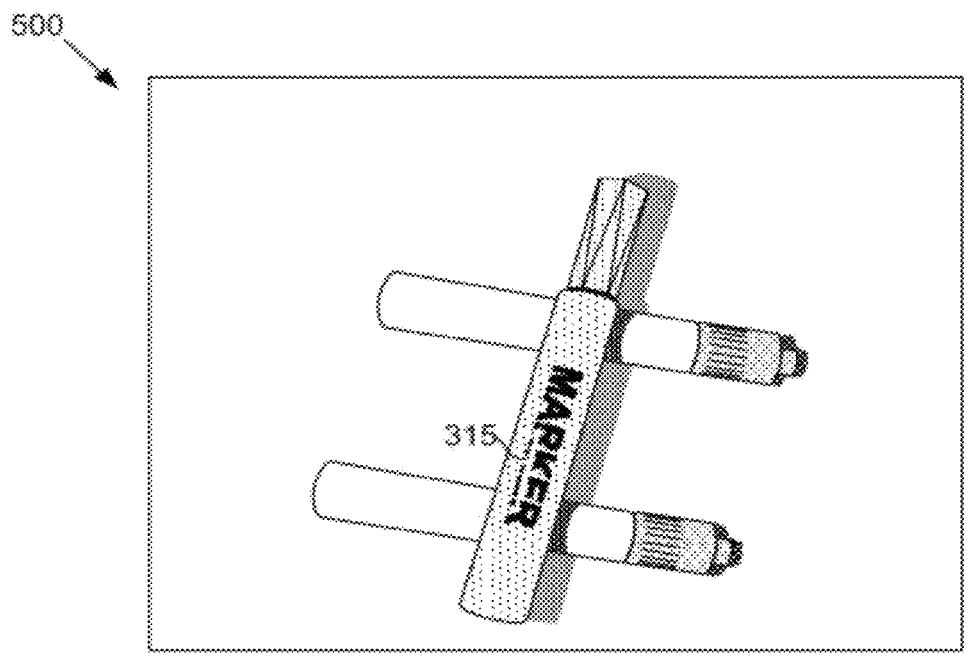
FIGS. 5A-5D are simulated images that describe the creation of a shadow mask, according to one example of principles described herein.

FIG. 5A shows a frame (500), which will be used as in a graphical example of the techniques for creating a shadow mask described below. Luminance decreases in shadow areas. The technique takes advantage of this observation by rotating the RGB color space into a luminance color space. The rotation aligns shadow effects along a numerically convenient mathematical axis. Many such spaces exist. One illustrative space is calculated pixel-by-pixel as follows where $R_i$, $G_i$, $B_i$, are the individual color planes of an initial frame i.

$$M_i(x, y) = \max(R_i(x, y), G_i(x, y), B_i(x, y)) \quad (1)$$

$$m_i(x, y) = \min(R_i(x, y), G_i(x, y), B_i(x, y))$$

$$L_i(x, y) = \frac{1}{2}(M_i(x, y) + m_i(x, y))$$

In this manner, a set of luminance frames $L=\{L_0, L_1, L_2, \ldots L_{n-1}\}$ is calculated from the initial RGB frames.

Maximum Luminance Frame

Multiple frames can be trivially fused together into a shadow mitigated frame by calculating the maximum frame. The maximum frame is a new frame where each pixel is the maximum of all the corresponding pixels in the luminance frames.

$$L\max(x,y)=\max(L_0(x,y), L_1(x,y), L_2(x,y), \ldots L_{n-1}(x,y)) \quad (2)$$

Figure 4:
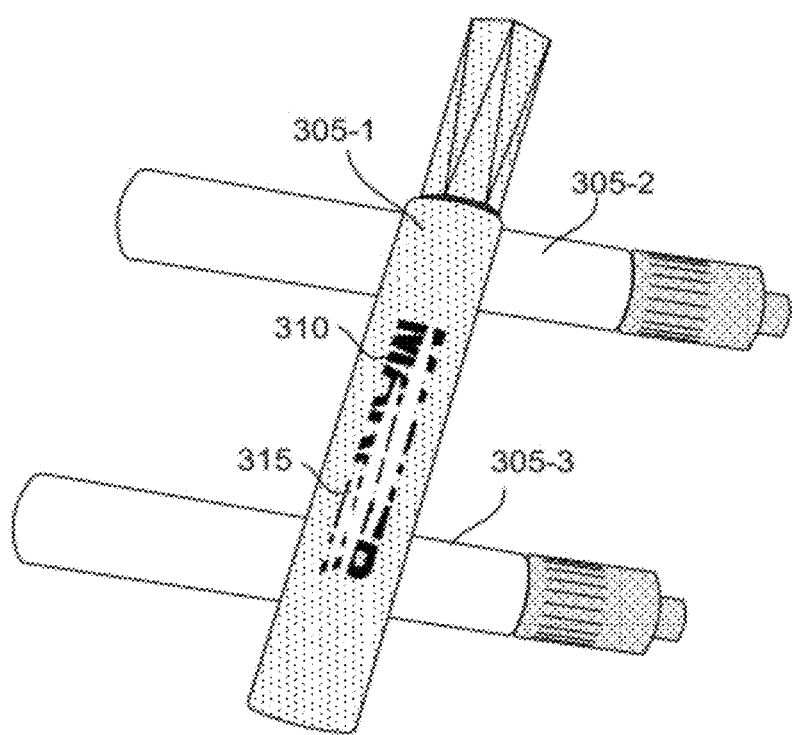
FIG. 4 is a simulated image that results from the fusion of images shown in FIGS. 3A-3C to eliminate shadows, according to one example of principles described herein.

The maximum luminance frame is a good predictor of a shadow-free frame. Unfortunately, it retains all the glare areas. Consequently, the maximum luminance frame contains the union of the glare areas of the initial frames and is unsuitable as a final fused result. FIG. 4 is a simulation of a maximum luminance frame with the glare areas (315) from all three of the illuminated frames retained in the image. The combined glare areas (315) further obscure the text (310) in this image.

Relative Difference Frames

The technique calculates a set of relative difference frames Ldiff by comparing each luminance frame against the maximum luminance frame.

$$Ldiff_i(x, y) = \begin{cases} \frac{L\max(x, y) - L_i(x, y)}{L\max(x, y)}, & \text{if } L\max(x, y) \geq t_{SHADOW} \\ 0, & \text{otherwise} \end{cases} \quad (3)$$

The relative difference frames are scaled between 0 and 1. They will have a value of 0 if the two luminance values are equal and 1 if they are maximally different. A value of $t_{SHADOW}=50$ out of 255 has been empirically found to work well. Since Lmax is approximately shadow free, the set of Ldiff frames are signals for suspected shadow areas.

Preliminary Shadow Masks

In one example, the preliminary shadow masks are generated by evaluating the pixels in each of the relative difference planes Ldiff against a threshold as described below in Eq. 4.

$$Dmask_i(x, y) = \begin{cases} 1, & \text{if } Ldiff_i(x, y) \geq t_1 \\ 0, & \text{otherwise} \end{cases} \quad (4)$$

Figure 5B:
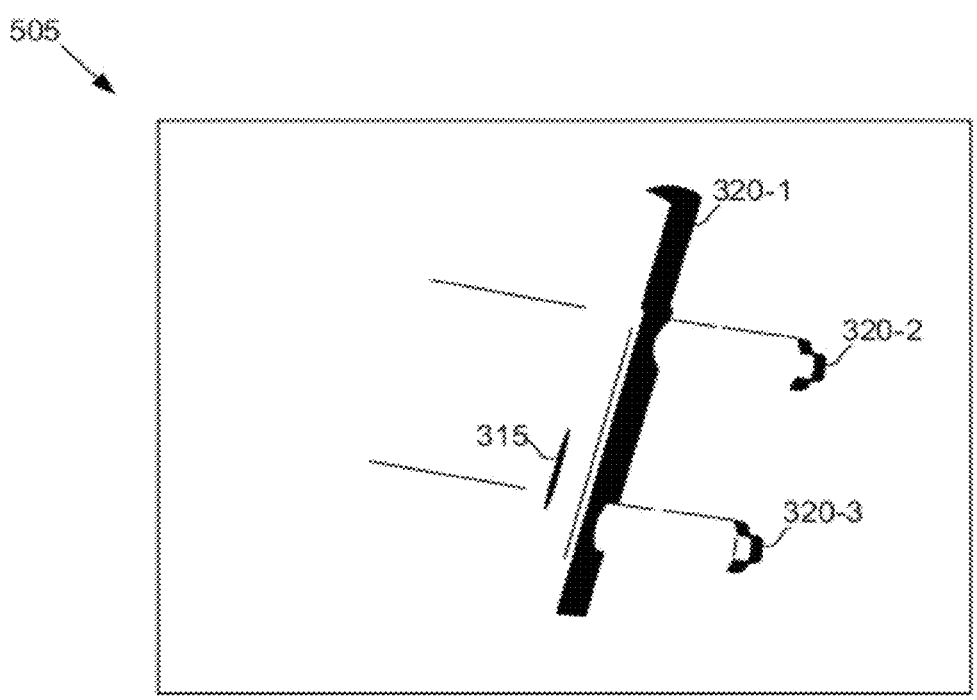

A value of $t_1=0.7$ has been empirically found to work well. The masks are morphologically dilated to fill small holes. The masks accurately predict the location of shadows, but they can misrepresent glare as shadow. FIG. 5B represents the preliminary shadow mask (505) for the frame (500, FIG. 5A). As can be seen in FIG. 5B, the preliminary shadow mask (505) has mistakenly classified glare area (315) as a shadow. Subsequent processes classify the pixels into S-type (shadow) and G-type (glare). The classification can add a significant amount of complexity to the technique because the distinction between the two areas is difficult to reliably make across a wide variety of scenes.

Edge Detection

The classification of pixels into S-type and G-type pixels can be performed in a variety of ways. In one implementation, an edge-based technique is used. The technique first detects edges by employing one of two edge detection filters. A first edge detection system is a Sobel process that is particularly adapted to less sophisticated computing systems. The second edge detection system is a Canny filter.

The Sobel process convolves the luminance frame with the two kernels in Eq. 5 to determine vertical and horizontal gradient maps.

$$hor = \begin{bmatrix} -1 & 0 & 1 \\ -2 & 0 & 2 \\ -1 & 0 & 1 \end{bmatrix} \quad ver = \begin{bmatrix} -1 & 2 & -1 \\ 0 & 0 & 0 \\ 1 & 2 & 1 \end{bmatrix} \quad (5)$$

$$Ghor_i = L_i \otimes hor \quad Gver_i = L_i \otimes ver$$

A combined gradient magnitude map $G_i$ and angle map $\theta_i$ are computed pixel-by-pixel.

$$G_i(x,y) = \sqrt{Gver_i(x,y)^2 + Ghor_i(x,y)^2}$$

$$\theta_i(x,y) = \arctan(Gver_i(x,y)/Ghor_i(x,y)) \quad (6)$$

A pixel is considered an edge pixel if it satisfies the condition given below by Eq. 7.

$$G_i(x,y) \geq t_G \quad (7)$$

The threshold $t_G$ is dynamically determined for each frame by analyzing the combined gradient map $G_i$, where M and N are the height and width of the frame.

$$t_G = \left(\frac{1}{MN}\sum_{y=0}^{M-1}\sum_{x=0}^{N-1} G_i(x,y)\right)^2 \quad (8)$$

A first series of edge maps $edg_i$ is then generated according to:

$$edg_i = \begin{cases} 1, & \text{if } G_i(x,y) \geq t_G \\ 0, & \text{otherwise} \end{cases}$$

The technique runs the process over each $L_i$ and over a new frame $La_i$ that has the dark areas of $L_i$ enhanced. $La_i$ is generated pixel-by-pixel using the following equation:

$$La_i(x,y) = 255\left[\frac{255 - L_i(x,y)}{255}\right]^7 \quad (9)$$

Applying Eq. 8 to the enhanced frame $La_i$ produces a second series of edge maps $edga_i$. The technique continues by using a logical OR function to combine the first and second series of edge maps pixel-by-pixel to create a more accurate third series of edge maps edgL by applying Eq. 9.

$$edgL(x,y) = \begin{cases} 1, & \text{if } (edg_i(x,y) = 1) \cup (edga_i(x,y) = 1) \\ 0, & \text{otherwise} \end{cases} \quad (9)$$

The filtering process is also run over the relative difference frames (but without enhancing the dark areas) to generate a fourth series of edge maps $edgDiff_i$.

Edge Comparison

Since the edge maps are from different illumination directions, there is frequently a small misalignment of corresponding edge pixels. The technique checks whether an edge pixel in one map has a corresponding edge pixel in another map. Consider two edge maps edgA, edgB and two corresponding edge points edgA(x, y), edgB(x', y'). If the technique finds an edge pixel at coordinates (x, y) in edgA, it searches a 5×5 window around coordinates (x, y) in edgB. If an edge pixel edgB(x', y') is found in the window, it then calculates the difference in gradient angle between the two pixels. A difference less than the threshold $t_\theta = \pi/5$ indicates edgB(x', y') corresponds to edgA(x, y). This windowed pixel comparison is applied as described below to produce a combined edge map edgCommon.

Initial Classification of Shadow Mask into S-Type and G-Type Regions

The technique compares the third series edgL and the fourth series edgDiff in the above edge comparison manner to produce the combined edge map series edgCommon. The technique performs a logical AND operation with the edg-Common series and the preliminary shadow mask series Dmask to produce a fifth series edgS1. A sixth edge map series, edgL5, is created from highlight enhanced maximum luminance maps L5. The L5 maps are calculated pixel-by-pixel with as shown below.

$$L5_i(x,y) = 255\left[\frac{L_i(x,y)}{255}\right]^5 \quad (10)$$

A seventh edge map series edgS2 is generated that contains only edges in edgS1 but not in the sixth edge map series edgL5. By eliminating the edge maps of highlight enhanced maximum luminance maps L5, edges of the glare areas are eliminated and edgS2 retains only edges associated with shadow areas. Thus, the sixth edge map series edgS2 contains the initial boundaries of S-type areas.

Object Edge Map

To generate an object edge map, the technique assumes that because glare and shadow shift according to the different illumination directions, glare and shadow areas in the initial frames may overlap but rarely share the same edges. Therefore, any pixel that has a corresponding pixel between any two frames in edgL is declared a true object edge pixel and marked as such in the object edge map edgObj.

Improvements to S-Type and G-Type Regions

Object remnants may exist in the edgS2 series there may be not only shadow edges but some remnant object edges. These remnants are object edges that disappear in Lmax because of glare. The technique removes the remnants by removing corresponding pixels between edgS2 and edgObj to generate a more accurate edgS3.

Figure 5C:
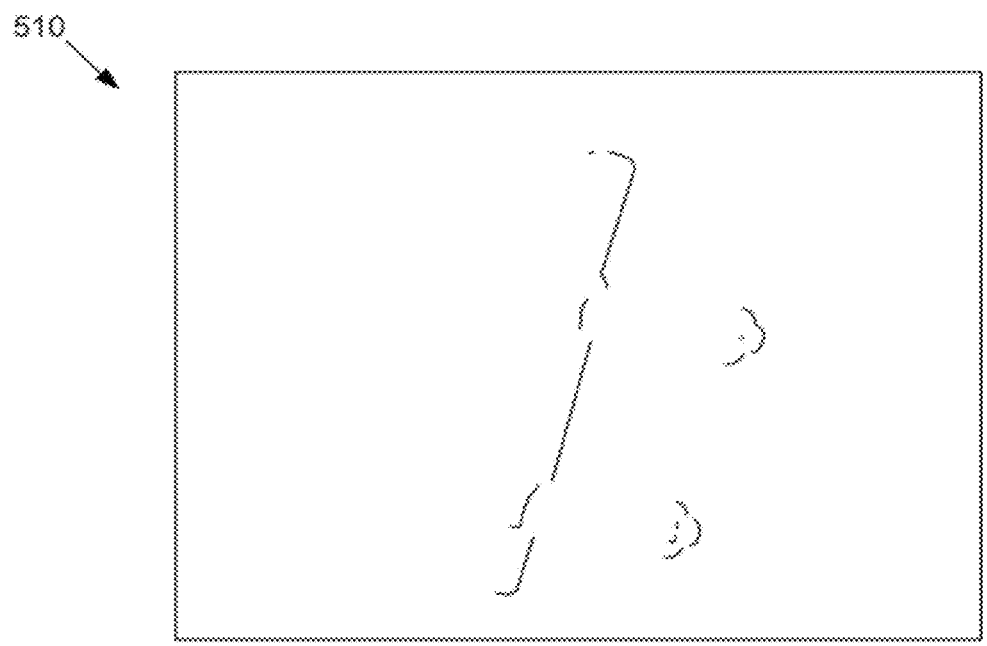

Still, small object remnants may exist. The technique suppresses these by simply removing small groupings from edgS3 to create edgS4. Small groupings are those with lengths smaller than the empirically found threshold $t_2=5$ pixels or those with a small ratio between their lengths. The empirically found threshold $t_{Ratio}=0.7$ works well for this example. This suppresses very short object remnants as well as traces of edges whose major parts have been deleted during the creation of edgS3. The threshold may be adapted to the specific images and system. FIG. 5C shows an illustrative edge map edgS4 (510) for the frame (500, FIG. 5A).

Region Growing to Achieve Final Shadow Mask from S-Type Edge Map

An accurate edge map showing at least partial images of shadows has been created in $edgS4_i$. The technique uses this as a seed to select and grow true shadow regions in the preliminary shadow masks. Recall that Dmask may contain both true shadows from the luminance series L and glare regions mistakenly tagged as shadow from Lmax.

The technique uses a modified four-neighbor connected component process where pixel b is considered connected to a if all of the following criteria are met:

$$\begin{cases} b \in \Omega \\ b \notin edgeObj_i \\ b \in Dmask_i \end{cases} \quad (11)$$

where $\Omega$ is the 4-point neighborhood of pixel a. Two pixels $a_0$ and $a_m$ are considered connected to each other with respect to edge seed pixel c if there exists a sequence $aseq = \{a_0, a_1, a_2, \ldots a_{p-1}\}$ such that $a_1$ is a connected to $a_0$, $a_2$ is a connected to $a_1$, and so on until $a_{p-1}$ is a connected to c.

Figure 5D:
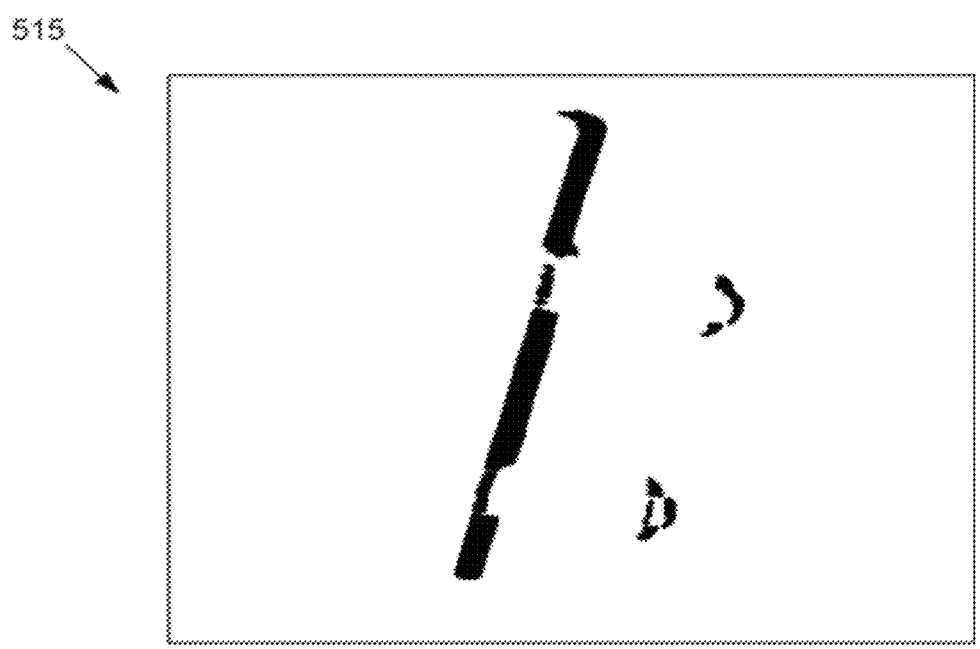

With these definitions, the region growing can performed by starting with an edge pixel c in $edgS4_i$ and growing all connected components with respect to c. This is repeated for all c to achieve a final shadow mask $S_i$. FIG. 5D illustrates a final shadow mask (515) for the illustrative frame in FIG. 5A.

Multi-Scale Fusion to Combine the Shadow-Free Frames

The series of shadow masks S defines where shadows occur in each of the initial camera frames. The second phase of the disclosed technique fuses the initial frames, omitting the ambient frame $I_0$, into a final frame Q with assistance from S. The fusion determines how to fill in shadow regions with content from non-shadowed regions. In the process, it also mitigates glare.

The ambient frame is omitted because ambient illumination is not controlled and may have a much different color temperature than the lamps. Fusing frames illuminated by different color temperatures can yield poor results.

Rudimentary fusing processes based on heuristics can be used to fill shadow regions. For example, the initial frame with the least amount of shadows can be modified by filling in shadow pixels with the average of the non-shadowed pixels in the other frames.

Alternately, the shadow regions can be filled by two dimensional interpolation. A recursive inverse distance weighting interpolation (Shepard interpolation) has been found to work well. Shepard interpolation is particularly well suited for objects against a relatively homogeneous background. In the imaging system described above, the upper surface of the platen is designed to act as a uniform background.

A variety of alternative approaches can also be used to combine the information to produce the final frame Q for display. For example, each input frame in the set $I=\{I_0, I_1, I_2, \ldots I_{n-1}\}$ can be formed into multiple sub-frames at different scales (resolutions) through a pyramid decomposition. The sub-frames are formed using Laplacian techniques that create band-pass filtered versions of the image at different scales. The sub-frames are examined for desired characteristics to produce an overall quality metric. However, the quality metric is zeroed for pixels within shadowed areas as defined by the appropriate shadow mask $S_i$. Let $Cont_i(x, y)$ be the contrast for pixel at coordinates (x, y) of a particular sub-frame of the pyramid of initial RGB frame i. Similarly, saturation $Sat_i(x, y)$ represents the saturation of the pixels and $Wex_i(x, y)$ represents the well-exposedness of the pixels. The sub-frames are then fused between the various frames using the quality metrics as weights. The overall metric, and averaging weight, for that pixel is $$W_i(x,y) = Cont_i(x,y) * Sat_i(x,y) * Wex_i(x,y) * S_i(x,y) \quad (12)$$

where $$S_i(x, y) = \begin{cases} 0, & \text{if the pixel is a shadow pixel} \\ 1, & \text{otherwise} \end{cases} \quad (13)$$

The fused sub-frames are then recombined to form the final frame Q. The modified multi-scale fusion explicitly brings out detail under shadow. A shadow pixel makes $W_i(x, y)=0$ by having $S_i(x, y)=0$ and so the fusion avoids shadow pixels. The fusion implicitly brings out detail under glare. Glare pixels have low contrast and well-exposedness so drive $W_i(x, y) \approx 0$.

Figure 6A:
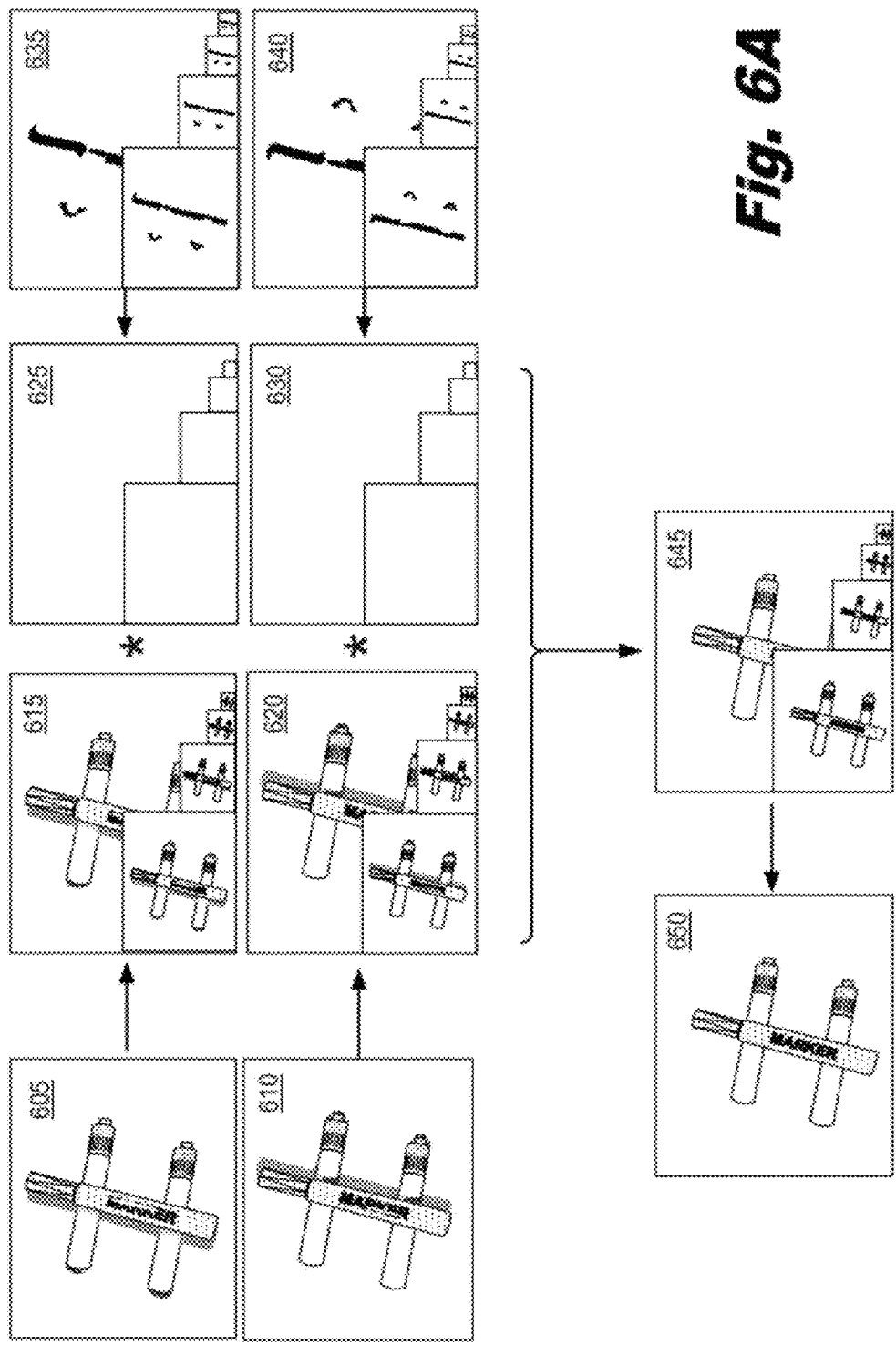
FIG. 6A is a simplified graphical representation of an image fusion process, according to one example of principles described herein.
Figure 6B:
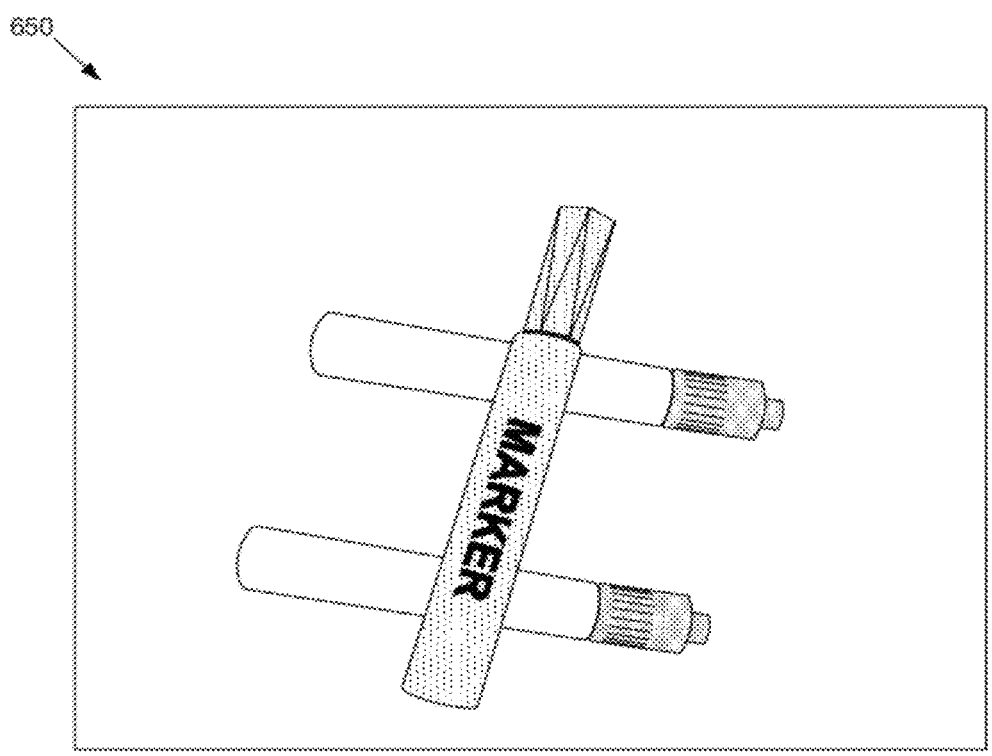
FIG. 6B is a simulated image produced by a process for glare and shadow mitigation, according to one example of principles described herein.

FIG. 6A is a simplified graphical representation of the fusion process described above. Two input frames (605, 610) are formed into multiple sub-frames at different scales (resolutions) through a pyramid decomposition to form Laplacian image pyramids (615, 620). Weight maps (625, 630) are generated to represent the desired image quality metrics. Shadow maps (635, 640) for the input frames are generate as described above. The weight maps (625, 630) are modified by the shadow maps (635, 640) as described above in Eq. 14 and calculated as shown in Eq. 13. The Laplacian image pyramids (615, 620) are then multiplied by their respective weight maps (625, 630) and combined to produce a fused Laplacian image pyramid (645) that is recombined to form the final frame (650). An enlarged version of the final frame (650) is illustrated in FIG. 6B. As can be seen in FIG. 6B, the final frame (650) does not include shadow or glare artifacts. These artifacts have been removed by the process described above and replaced with data from other images.

Figure 7:
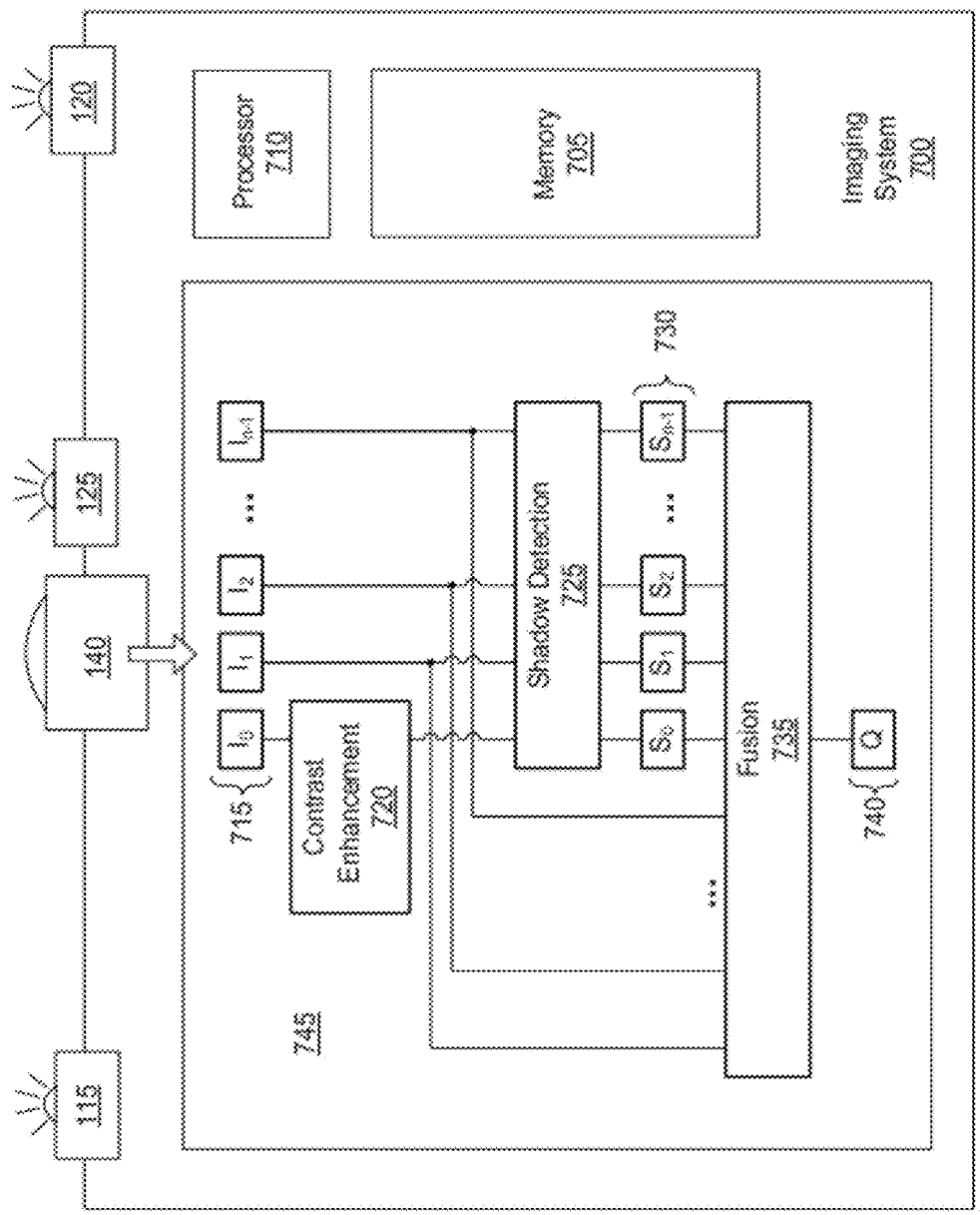
FIG. 7 is a block diagram of a system for glare and shadow mitigation, according to one example of principles described herein.

FIG. 7 is an illustrative imaging system (700) for mitigation of glare and shadows. The system (700) includes multiple illumination sources (115, 120, 125), a camera (140), a processor (710) and a memory (705). A glare and shadow mitigation module (745) is implemented by the processor (710) and memory (705). The camera (140) generates a set of input frames (715). In this example, each of the input frames has been taken under different lighting conditions. A first frame $I_0$ has been taken under ambient lighting. A second frame $I_1$ may have been taken with illumination provided by the left illumination source, a third frame may have been taken with illumination provided by the right illumination source and so forth. Each of the frames may be filtered, enhanced, or otherwise altered. In this example the ambient frame $I_0$ has been enhanced by a contrast enhancement module (720).

The frames (715) are input into a shadow detection module (725) that operates as described above in Eqs. 1-12 to produce a set of shadow maps $S_i$ (730), one shadow map for each frame. The shadow maps (730) and input frames (715) are directed into a fusion module (735) where they are decomposed, weighted and combined as described above in Eq. 13, Eq. 14, and FIG. 6A to produce the final image (740).

Figure 8:
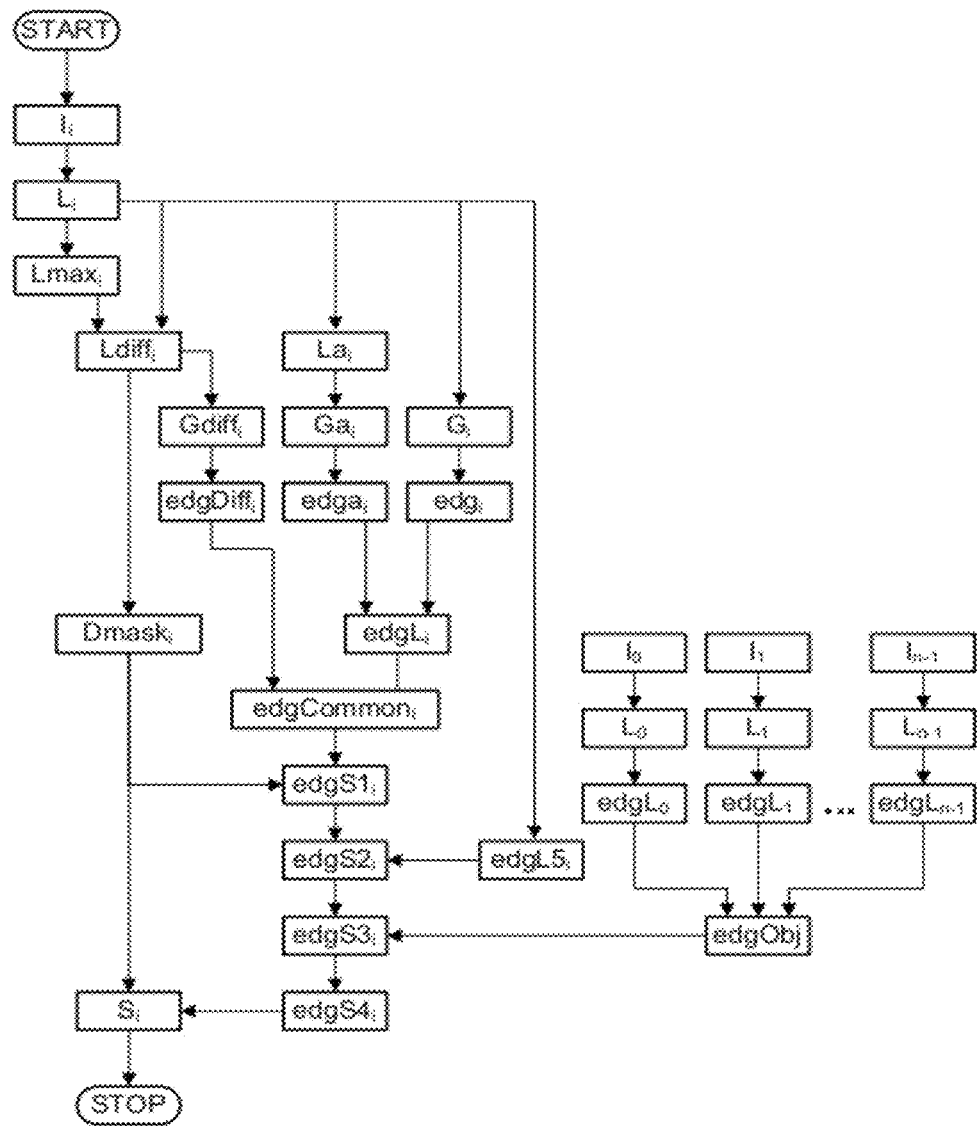
FIG. 8 is a block diagram of data structures and data flow within a system for glare and shadow mitigation, according to one example of principles described herein.

FIG. 8 is diagram of data flow through the image system during the creation of the shadow masks. A set of initial frames $I_i$ are acquired. Luminance frames $L_i$ are calculated from the initial frames as described in Eq. 1. From the luminance frames $L_i$, the maximum luminance frame Lmax is calculated according to Eq. 2. From Lmax and $L_i$, the relative difference frames $Ldiff_i$ are calculated according to Eq. 3. Preliminary shadow masks $Dmask_i$ are calculated from $Ldiff_i$ according to Eq. 4.

Edge detection applies an edge detection technique to the luminance frames $L_i$ to produce a combined gradient magnitude map $G_i$ and enhanced frames $La_i$ according to Eq. 9. Two edge map series $edg_i$ and $edga_i$ are fused to produce a more accurate edge map series $edgL_i$ according to Eq. 10. The filtering process is also run over the relative difference frames (but without enhancing the dark regions) to generate a second series of edge maps $edgDiff_i$.

Edge maps edgCommon are formed by combining the edge maps edgL and edgDiff. This process accommodates misalignments by searching for proximal edge pixels in different maps and appropriately combining them. Specifically the technique performs a logical AND operation with the edgCommon series and the preliminary shadow mask series Dmask to produce a fourth series edgS1. A sixth edge map series, edgL5, is created from highlight enhanced maximum luminance maps L5 that are derived from maximum luminance frames. A fifth series edgS2 is generated by that contains only edges in edgS1 but not in a new edge map series edgL5. This eliminates edges associated with glare areas and retains only edges associated with shadow areas.

To generate an object edge map edgObj, the technique uses the luminance frames derived from the initial frames and edge map edgL$_i$ to identify true object edge pixels that are recorded as object edge map edgObj. The edgObj and edgS2 are used to generate a more accurate edgS3, which is filtered to produce edgS4. The final shadow mask S$_i$ is created by growing edge pixels in edgS4$_i$.

The systems and methods described above are only illustrative examples. A variety of other configurations and techniques could be used. For example, the system is described above as having multiple lighting sources that are sequentially activated to illuminate a target from different directions. However, the target could be moved to produce changes in lighting from a stationary light source. For example, the platen could be replaced with a rotary table. As the rotary table moves, a single light could generate the desired illumination. The target moves to produce changes in lighting by a stationary light source. A variety of other image processing techniques could also be used. For example, although the Sobel edge detection process is described above, it could be replaced with a Canny filter that is based on the first derivative of Gaussian filtered image.

Figure 9:
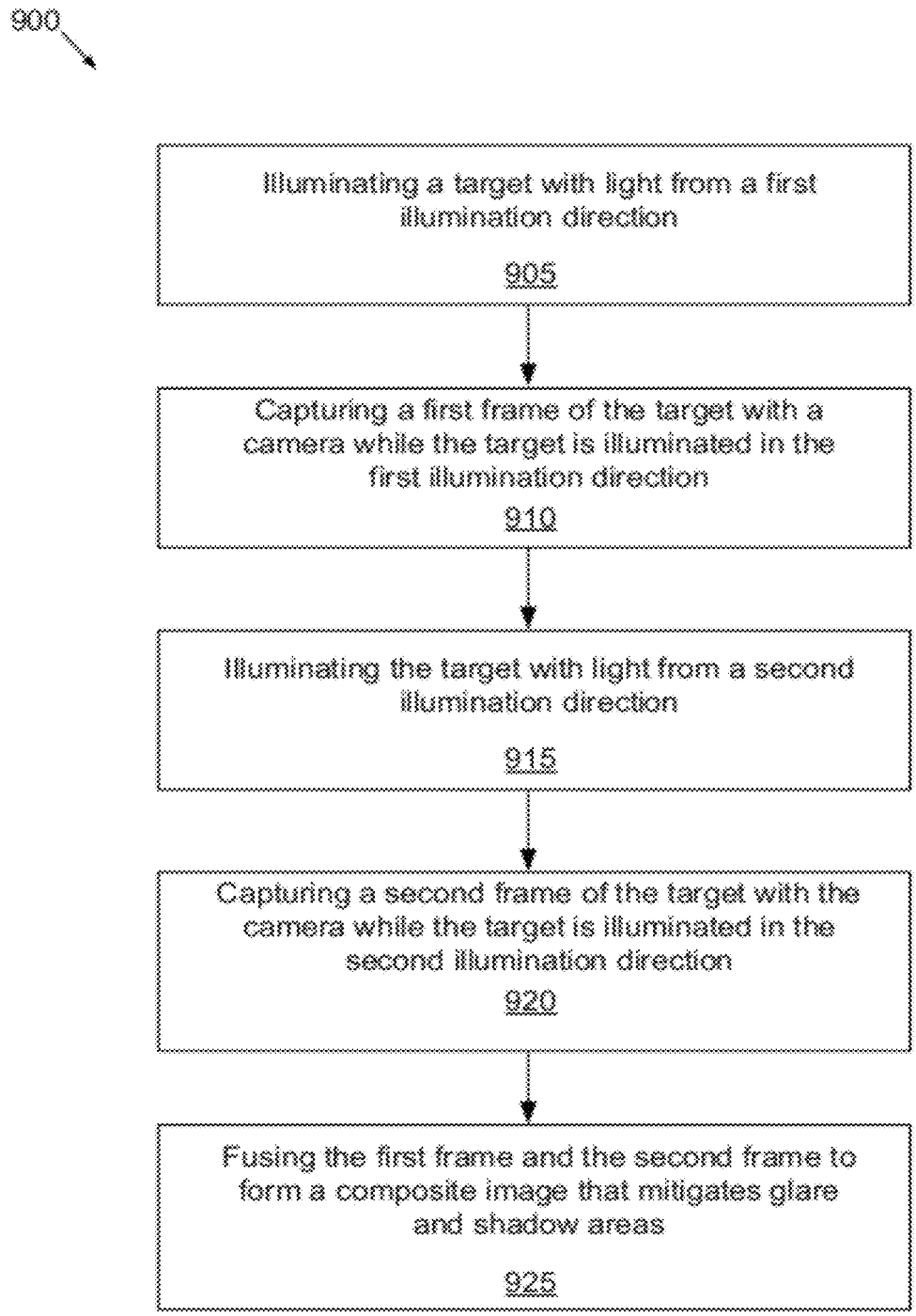
FIG. 9 is flow chart of an illustrative method for glare and shadow mitigation, according to one example of principles described herein.

FIG. 9 is a flow chart of an illustrative method (900) for glare and shadow mitigation by fusing multiple frames. The method includes illuminating the target with light from a first illumination direction (block 905) and capturing a first frame of the target with a camera while the target is illuminated in the first illumination direction (block 910). The method also includes illuminating the target with light from a second illumination direction (block 915) and capturing a second frame of the target with the camera while the target is illuminated in the second illumination direction (block 920). The first frame and second frame are fused together to form a composite image that simultaneously mitigates glare and shadow areas (block 925).

As discussed above, the method may also include detecting a shadow area within the first frame using a variety of techniques including edge detection. In many instances, the differences in lighting angles between the two frames results in at least a portion of the shadow area within the first frame with a corresponding unshadowed area in the second frame. The frames can then be weighted using a contrast quality metric or other factors that remove glare regions from the first image and second image.

Shadow masks of the individual frames can be used to influence the weighting of the frames such that shadowed areas in the first frame are replaced by unshadowed areas in the second frame. In one implementation, the shadow mask is formed by calculating luminance frames for each of the first frame and the second frame and calculating a substantially shadow free frame by selecting maximum luminance pixel values from the luminance frames to form a maximum luminance frame. Each luminance frame is compared against the maximum luminance frame to produce a set of relative difference frames. The shadow masks are created by evaluating pixels in each of the relative difference frames against a threshold. The pixels are then classified as either a glare type pixel or shadow type pixel. This classification can be performed in a variety of ways including edge detection of the luminance frames. Edges that are associated with glare are removed, leaving only edges that are associated with shadows in the final edge map. The shadowed pixels are then grown according to the final edge map to produce the final shadow mask.

In one illustrative embodiment, the process of fusing the first frame and the second to form a composite image with reduced glare and shadow areas includes decomposing each of the first frame and the second frame to form Laplacian image pyramids. Each Laplacian image pyramid is weighted by a weight map that captures at least one image quality metric and is modified by the final shadow mask. The Laplacian image pyramids are fused to produce a fused Laplacian image pyramid (645) that is recombined to form the final frame (650).

ADVANTAGES

Glare and shadow artifacts produced by lighting effects in image can be both distracting and obscure information about the target. The shadow and glare mitigation systems and methods described above provide high image quality while simultaneously mitigating both glare and shadow. By capturing images of the target with illumination from at least two unique directions, multiframe fusing can create an image that simultaneously handles both the difficult issues of glare and shadow.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for glare nd shadow mitigation by fusing multiple frames comprising:
    illuminating a target with light from a first illumination direction;
    capturing a first frame of the target with a camera while the target is illuminated in the first illumination direction;
    illuminating the target with light from a second illumination direction;
    capturing a second frame of the target with the camera while the target is illuminated in the second illumination direction; and
    fusing, in a single operation, the first frame and the second frame such that glares and shadows are simultaneously mitigated to form a composite image with mitigated glare and shadow areas.

2. The method of claim 1, further comprising weighting the first frame and the second frame using a shadow mask which removes shadow areas from the first image and second image during fusing.

3. The method of claim 2, further comprising:
    replacing at least a portion of a shadow area within the first frame with a corresponding unshadowed area in the second frame; and
    weighting the first frame and second frame using a contrast quality metric which removes glare areas from the first image and second image.

4. The method of claim 1, in which fusing the first frame and the second frame to form a composite image comprises:
    identifying glare and shadow areas within the first frame;
    identifying glare and shadow areas within the second frame; and
    fusing the first frame and the second frame together such that the glare and shadow areas are simultaneously mitigated.

5. The method of claim 1, further comprising detecting a shadow area within the first frame and second frame using edge detection to create edge maps.

6. The method of claim 5, further comprising a windowed pixel comparison of edge maps to accommodate small misalignments between corresponding pixels in the edge maps.

7. The method of claim 5, in which the edge detection comprises:
    calculating luminance frames for each of the first frame and the second frame;

generating combined gradient magnitude maps from the luminance frames; and applying an edge detection technique to the combined gradient magnitude maps to produce a first series of edge maps.

8. The method of claim 7, further comprising:
calculating shadow enhanced frames;
applying an edge detection technique to the shadow enhanced frames to produce a second series of edge maps.

9. The method of claim 8, further comprising combining the first series of edge maps and second series of edge maps to produce third series of edge maps for each of the first frame and second frame.

10. The method of claim 7, further comprising calculating a substantially shadow free frame by selecting maximum luminance pixel values from the luminance frames to form a maximum luminance frame.

11. The method of claim 10, further comprising comparing each luminance frame against the maximum luminance frame to produce a set of relative difference frames.

12. The method of claim 11, further comprising:
generating a fourth series of edge maps from the set of relative difference frames;
generating a fifth combined edge map series by combining the third series of edge maps and the fourth series of edge maps to accommodate small misalignments between pixels in the third and fourth series of edge maps;
generating a sixth edge map series from highlight enhanced maximum luminance maps; and
eliminating edges associated with glare areas by generating a seventh edge map series that contains only the edges in the fifth edge map series but not in the sixth edge map series.

13. The method of claim 9, further comprising creating an object edge map by comparing an edge map of the first frame and an edge map of the second frame to find corresponding pixels in both the first and second frames.

14. The method of claim 13, further comprising:
growing true shadow areas from seventh edge map series to produce a final shadow mask; and
applying the final shadow mask during fusion of the first frame and second frame to eliminate the effect of shadowed areas designated in the shadow mask from the final frame.

15. The method of claim 1, in which fusing the first frame and the second frame to form a composite image with reduced glare and shadow areas comprises decomposing each of the first frame and the second frame to form Laplacian image pyramids.

16. The method of claim 15, further comprising weighting each Laplacian image pyramid by a weight map which captures at least one image quality metric, the weight map being modified by a shadow mask.

17. An imaging system comprising:
a first image of a target illuminated by light from a first direction;
a second image of the target illuminated by light from a second direction; and
a glare and shadow mitigation module for:
receiving the first image and second image;
calculating luminance frames for each of the first frame and the second frame; and
fusing, in a single operation, the first image and second image luminance frames to simultaneously mitigate glares and shadows to form a combined image with reduced glare and shadow.

18. The system of claim 17, further comprising:
shadow masks produced by the shadow detection module which represent the shadow areas cast by the target in the first image and the second image;
Laplacian image pyramids which were decomposed from the first image and the second image; and
weight maps derived from image quality characteristics of the first mage and the second image, the weight maps being modified by the shadow masks such that shadow area cast by the target are given no weight;
in which the combined image is formed by applying the weight maps to the Laplacian image pyramids and combining the Laplacian image pyramids.

19. The system of claim 18, in which the light from the first direction and the light from a second direction have substantially the same color temperatures and the first direction is different from the second direction.

20. A method for glare and shadow mitigation by fusing multiple frames comprising:
illuminating a target with light from a first illumination direction;
capturing a first frame of the target with a camera while the target is illuminated in the first illumination direction;
illuminating the target with light from a second illumination direction;
capturing a second frame of the target with the camera while the target is illuminated in the second illumination direction;
detecting a shadow area within the first frame and second frame using edge detection to create edge maps;
comparing windowed pixels of the edge maps to accommodate small misalignments between corresponding pixels in the edge maps; and
fusing the first frame and the second frame such that glares and shadows are simultaneously mitigated to form a composite image with mitigated glare and shadow areas.

* * * * *